US007062428B2

(12) United States Patent
Hogenhout et al.

(10) Patent No.: US 7,062,428 B2
(45) Date of Patent: Jun. 13, 2006

(54) NATURAL LANGUAGE MACHINE INTERFACE

(75) Inventors: Wide Roeland Hogenhout, Wemmel (BE); Robert John Noble, Great Shelford (GB)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/803,974

(22) Filed: Mar. 13, 2001

(65) Prior Publication Data

US 2001/0053969 A1 Dec. 20, 2001

(30) Foreign Application Priority Data

Mar. 22, 2000 (GB) ................................ 0007016.9

(51) Int. Cl.
*G06F 17/27* (2006.01)

(52) U.S. Cl. .......................... 704/9; 704/235; 704/275

(58) Field of Classification Search .................... 704/9, 704/275, 235; 700/83

See application file for complete search history.

(56) References Cited

U.S. PATENT DOCUMENTS 4,736,296 A * 4/1988 Katayama et al. ............. 704/8
5,369,575 A 11/1994 Lamberti et al. .............. 704/9
5,642,519 A * 6/1997 Martin .......................... 704/9
5,884,266 A 3/1999 Dvorak ....................... 704/275
6,246,981 B1 * 6/2001 Papineni et al. ............ 704/235
6,253,184 B1 * 6/2001 Ruppert ...................... 704/275
6,311,150 B1 * 10/2001 Ramaswamy et al. ......... 704/1
6,400,996 B1 * 6/2002 Hoffberg et al. .............. 700/83
6,415,257 B1 * 7/2002 Junqua et al. .............. 704/275
6,446,035 B1 * 9/2002 Grefenstette et al. .......... 704/1

FOREIGN PATENT DOCUMENTS

GB 2344917 6/2000

* cited by examiner

*Primary Examiner*—Richemond Dorvil
*Assistant Examiner*—Qi Han
(74) *Attorney, Agent, or Firm*—Fitzpatrick, Cella, Harper & Scinto

(57) ABSTRACT

A user interface is provided for use with a machine which can use a number of natural language instructions to reach one of a plurality of possible machine states. In order to provide information to a user to enable them to more efficiently achieve the current machine state using natural language instructions, the current state of the machine is determined and used to generate information to inform the user of a natural language instruction which can be input to a machine to achieve the current state of the machine.

30 Claims, 4 Drawing Sheets

NATURAL LANGUAGE MACHINE INTERFACE

BACKGROUND OF THE INVENTION

1. Field of the Invention

The present invention generally relates to a user interface apparatus for use with a machine which can receive natural language instructions to reach one of a plurality of possible states.

2. Description of Related Art

Achieving the most efficient method of interfacing a user with a machine is a problem that has been given a great deal of consideration in the prior art. In one form of interface, a formal language is used for interaction between the user and the machine. An example of a formal language interface is the interface used in a telephone which has a number of buttons and a rigid specification for what happens when a certain sequence of buttons is pressed. The problem with this type of formal language interface is that it is not flexible and requires the user to learn the formal instructions required.

In another type of interface, a natural language interface is used which allows input in many different ways. A natural language interface allows the user to input an instruction in a more or less unrestricted way. Although the demand for learning using a natural language interface is low, when a machine is first used, or when a machine is used infrequently, users can feel uncertain about how to instruct a machine efficiently. The user may not know what words to use or how to phrase the instruction. They may use unusual words or words that are hard for the machine to recognise or understand. The user may not realise that something can be input in a simpler form. A user may spend a lot of time meandering around the various options a machine has available and then after some time arrive at the instruction that they are satisfied with. A user may then be left wondering how they could specify this instruction more efficiently or directly. If the machine has another mode of input e.g. buttons of a formal language interface, the user may specify instruction using the buttons of the formal language interface. The user may then be curious as to how the instruction could have been entered using the natural language interface.

SUMMARY OF THE INVENTION

The present invention provides an interface for a machine which can receive a number of natural language instructions to reach one of a plurality of possible machine states. The invention provides feedback to a user to inform them of the natural language instructions which could have been input to reach the current state of the machine. Thus the current state of the machine is determined and used to generate information to inform the user of natural language instructions which can be input to achieve the current state of the machine.

In one embodiment of the present invention, the generation of the information for the user is triggered by a request from the user.

In an embodiment of the present invention, the current state of the machine is defined by a data structure containing attributes: each attribute having a number of possible values. Each attribute can have at least one natural language fragment associated with it and the information is generated by building up a natural language instruction from the natural language fragments for the attributes of the current state of the machine. The natural language instruction is built up from the natural language fragments in accordance with natural language rules.

In one embodiment of the present invention, the natural language fragments can be ordered in accordance with rules in order to generate the natural language instruction in a preferred ordered form.

The natural language instruction can comprise text which can either be displayed to the user or put through a speech synthesiser in order to generate a speech output. Alternatively, the natural language instruction can be formed from speech fragments to comprise a speech instruction.

The present invention is applicable to any processing apparatus such as a computer, a facsimile machine, or a photocopier. The interface can be provided in the apparatus.

The functionality of the present invention can be provided by computer program code for controlling a processor to implement the process. Thus the present invention encompasses the computer program code and a carrier medium carrying the computer program code. The carrier medium can comprise any suitable medium such as a storage medium e.g. floppy disk, hard disk, CD ROM, magnetic tape, or programmable memory device, or a carrier signal such as an electrical signal carrying the computer program code over a network such as the Internet.

The functionality of the present invention can thus be provided on a conventional machine with a natural language interface simply by providing the computer program code to the machine.

BRIEF DESCRIPTION OF THE DRAWINGS

Embodiments of the present invention will now be described with reference to the accompanying drawings, in which.

DESCRIPTION OF THE PREFERRED EMBODIMENTS

Figure 1:
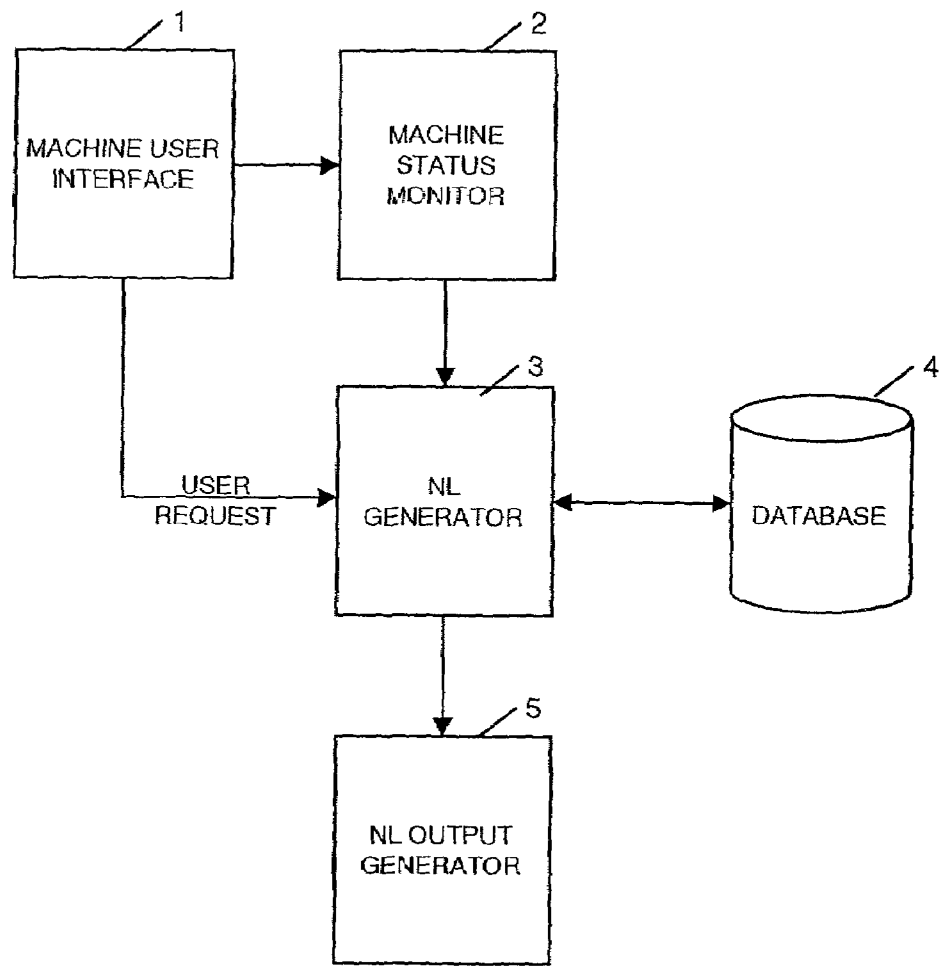
FIG. 1 is a schematic diagram of the machine incorporating the user interface in accordance with an embodiment of the present invention.

Referring now to FIG. 1, a machine is provided with a machine user interface 1 to allow a user to input instructions to the machine. The instructions can be entered using natural language instructions as at least one mode of input. The machine user interface 1 may also allow formal language instructions to be entered e.g. by providing a numeric keypad or pointing device. The natural language interface of the machine user interface 1 can comprise any means of allowing the input of natural language e.g. the keyboard. In this embodiment however, the machine user interface includes a speech interface for the recognition of speech in natural language form.

The instructions entered using the machine user interface 1 will cause the machine to enter a machine state. This is monitored by the machine status monitor 2.

The machine user interface 1 is provided with means to allow a user to request the output of a natural language instruction which could have been used by the user to achieve the current state of the machine. Thus the user request, when generated by a user, is input to a natural language generator 3 which upon receipt of the user request retrieves information on the current state of the machine from the machine status monitor 2. Using this information together with information in a database 4, a natural language instruction appropriate to achieve the current state of the machine is generated and received by a natural language output generator 5 to output the natural language instruction to the user.

The functional components of the natural language generator 3 and the database 4 will now be described in more detail with reference to FIG. 2. The operation of this embodiment of the present invention will also be described with reference to the flow diagram of FIG. 4.

In step S1 the process is started and in step S2 the interface waits until a user request is received by a natural language collector 30 in the natural language generator 3. When the user request is received, in step S3, the natural language collector 30 retrieves the machine state from the machine status monitor 2 and determines whether the user has specified any commands. If the user has not specified any commands, e.g. if the machine is still in its default state, the natural language collector 30 does nothing and the process returns to step S2 to await a user request. If on the other hand, the user has specified commands, and the machine status is not in a default condition, in step S4, the natural language collector 30 uses attributes and values for the attributes for the machine state to look up associated natural language fragments in the database 41 in order to create a sentence from the natural language fragments for each attribute. A sentence is created in accordance with generation patterns in the database 42. The generation patterns include natural language rules required to generate the natural language instruction.

The natural language instruction is then received by a reorder unit 31 which performs ordering of the fragments in step S5 using order data in the database 43. The order data comprises heuristics on the order of chunks of natural language.

Figure 4:
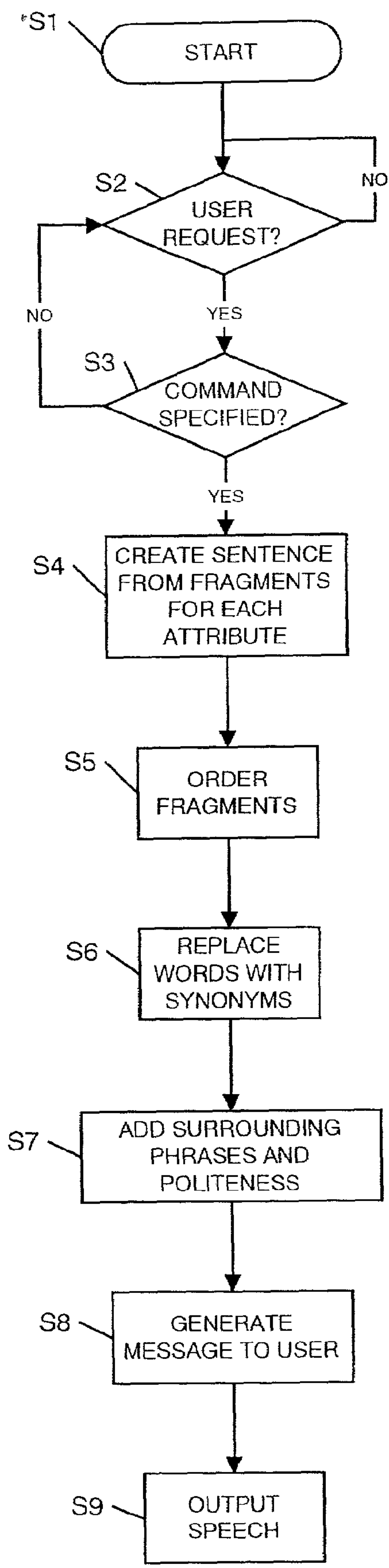
FIG. 4 is a flow diagram illustrating the operation of the user interface in accordance with an embodiment of the present invention.

The ordered natural language instruction is then received by a text replacer 32 which will replace words in the natural language instruction with synonyms (step S6 in FIG. 4). The words chosen for replacement can depend upon a user model stored in a database 44, preferred synonyms stored in database 45 or known recognition problems stored in a database 46. For example, in the present invention, the natural language input can be via speech recognition and recognition errors can lead to known problems. Thus the text replacer 32 can chose preferred synonyms which would result in correct recognition of the input natural language instruction.

Figure 3A:
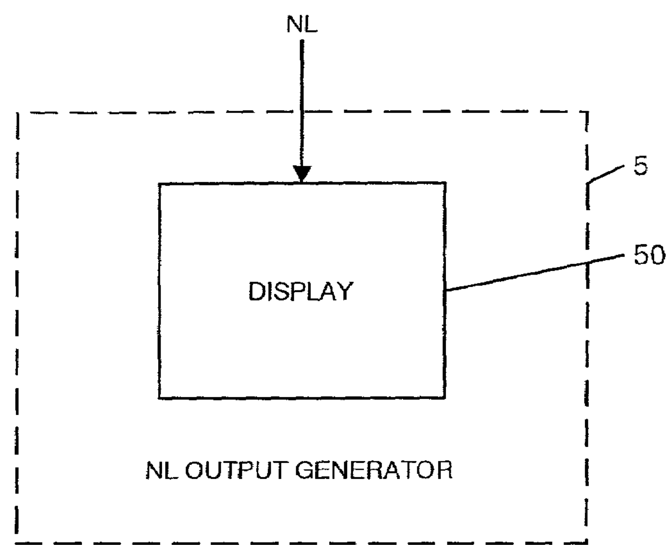
FIGS. 3*a* and 3*b* illustrate in more detail alternative embodiments for the natural language output generator of FIG. 1.
Figure 3B:
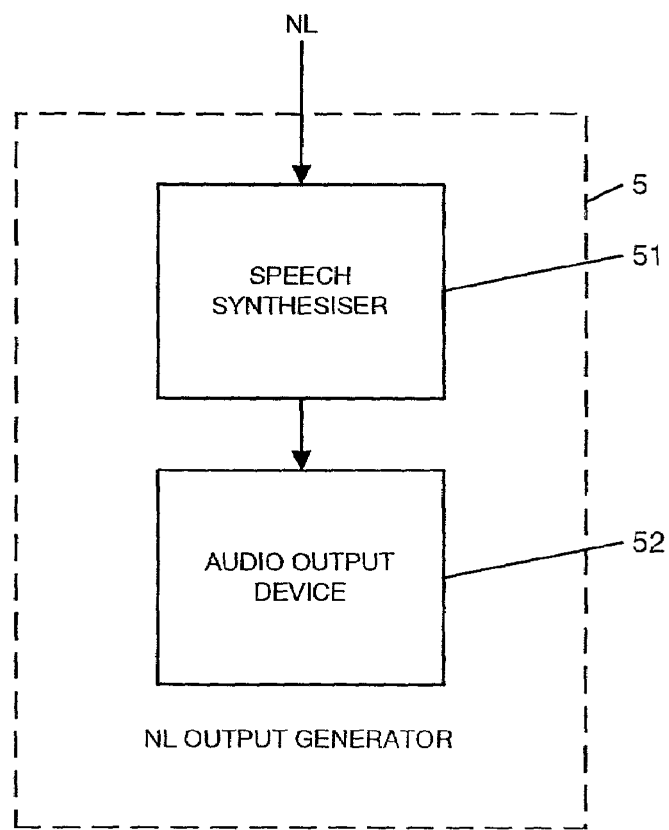

The natural language instruction is then received by a text adder 33 which can add surrounding phrases such as "the instruction you could give is" and politeness terminology such as "please" and "thank you". Text adder 33 implements step S7 of the flow diagram of FIG. 4 using the database 47 which contains polite phrases and surrounding phrases. Thus in step S8 the output of the generator is a natural language instruction to the user and in step S9 a speech message is output to the user. FIGS. 3*a* and 3*b* illustrate two alternative forms of the natural language output generator 5. In FIG. 3*a* an embodiment is illustrated in which the natural language instruction which is generated as text is simply displayed on a display 50.

In the alternative embodiment of FIG. 3*b*, the natural language instruction is input as text to a speech synthesiser 51 which generates speech data. The speech data is input to an audio output device 52 which generates an audible natural language instruction to the user.

In an embodiment of the present invention applied to a photocopy machine, the current state of the photocopy machine can be given by a number of attributes including:

| | |
|---|---|
| command | copy |
| number required | 21 |
| zoom | enlarge |
| % | 141 |
| single/double sided | double |

Thus in this embodiment the attribute "command" is set to the value of "copy" which is a default value. The number of copies required is set to the value of 21. The "zoom" attribute is set to a value "enlarge" and the percentage enlargement attribute is set to "141". Further, the double or single sided copy attribute is set to a value of "double". Thus the internal state of the machine that was achieved by a user entering instructions using the machine user interface 1 is stored as a data structure comprising attributes. Using the attributes and the values for the attributes, natural language fragments can be looked up from the natural language fragments database 41. For example, the "command" attribute is set to its default value and thus no natural language fragment is generated. The "number required" attribute is set to "21" and thus the natural language fragment "21 copies" is generated. In order to avoid having to store all of the possible numbers e.g. 0 to 999, numbers can be built from their own natural language fragments e.g. 21 can be built from the natural language fragment "20" and "1". This reduces the storage requirement. The "zoom" attribute is set to "enlarge" and thus the natural language fragment "enlarge to" is generated. The percentage enlargement attribute is set to "141" and thus in the same way a number of copies is generated on a trio number of natural language fragments, a natural language fragment of "141%" is generated. Because the "single/double sided" attribute is set to "double" the natural language fragment "double sided" is generated. Thus the natural language collector 30 builds the natural language instruction "21 copies enlarged to 141% double sided". The reorder unit 31 may then reorder this to a more logical order such as "21 copies double sided enlarged to 141%". The text replacer 32 can then replace text in the natural language instruction. For example, the natural language chunk "enlarged to 141%" could be replaced with "enlarge to A3". The text adder 33 can then add surrounding phrases and politeness phrases. Thus the complete output information to the user can comprise "the instruction you could have given is 21 copies double sided enlarged to A3 please".

Figure 2:
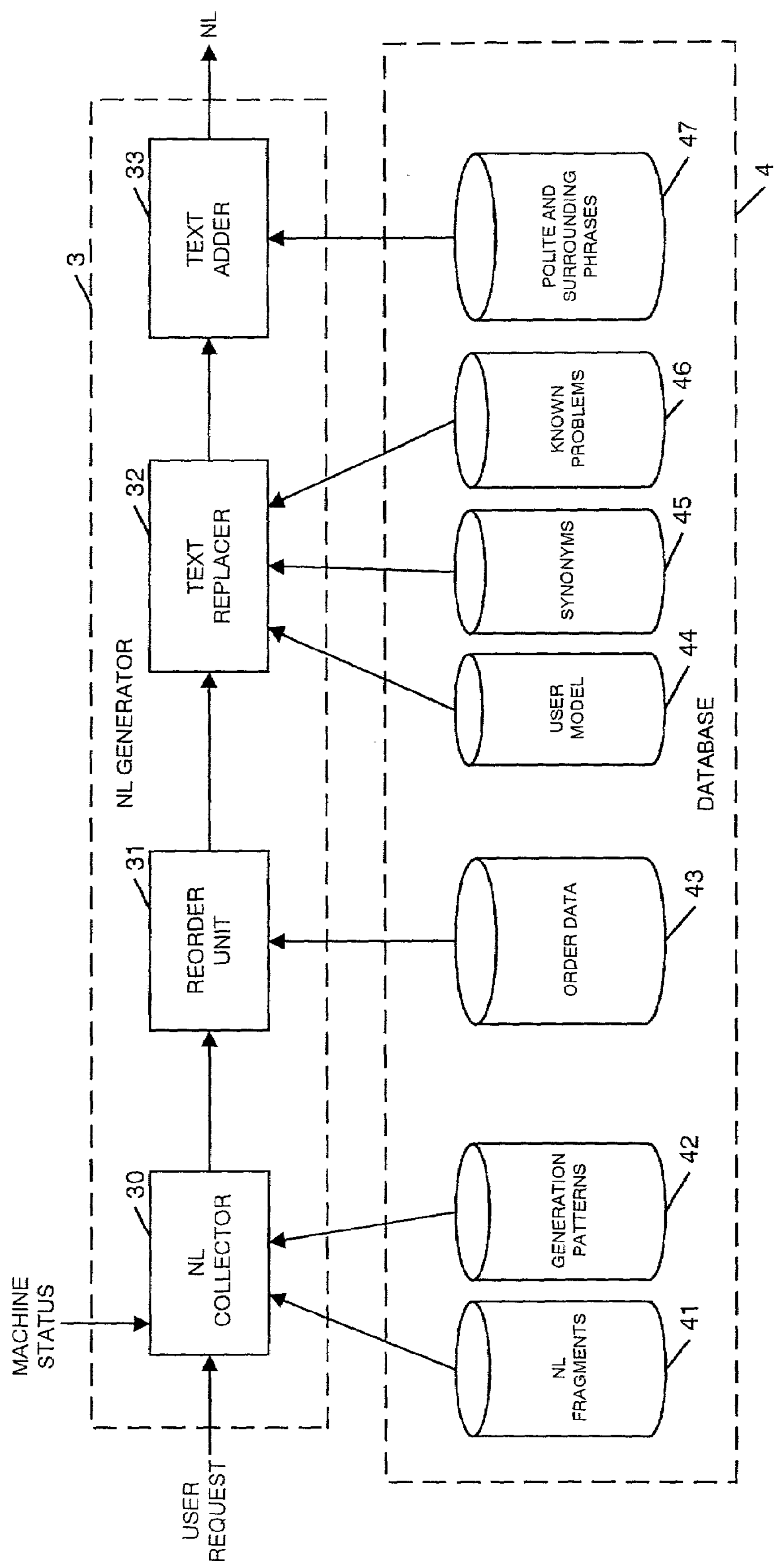
FIG. 2 is a schematic diagram of the natural language generator and the database of the embodiment of FIG. 1 in more detail.

The text replacer 32 in FIG. 2 can replace text in dependence upon a user. For example if a user is a beginner, the text replacer 32 could replace more complex natural language instruction chunks with simpler terminology. The synonyms database 35 can for example take into consideration terminology previously used by a user. For example, where a user previously input the natural language instruction "two sided" instead of "double sided" the text replacer

32 could replace "double sided" in the natural language instruction given above with "two sided" since this is the preferred form of the user.

The text replacer 32 can also replace text based on known problems as discussed above. For example, if the user enters the instruction "double sided" using a speech recognition interface, and it is not recognised correctly, the text replacer 32 could instead use the knowledge from the database 46 to use the phrase "two sided" instead to avoid the recognition error.

Although the present invention has been described hereinabove with reference to a specific embodiment related to a photocopy machine, the present invention is applicable to any form of machine. Further, although the natural language generator has been described in the above embodiment as generating text, the present invention encompasses the generation of natural language in the form of speech data. In such an embodiment the natural language fragments comprise speech fragments which are built up, reordered, replaced and added to using the natural language collector, the reorder unit, the replacer and the adder.

The present invention is thus able to provide immediate feedback to a user to enable them to readily learn how most efficiently to interface with the machine using natural language instructions. The following are three examples showing how the present invention can aid usability of a machine.

In a first scenario, a user who does not know how to use the voice interface goes to a copying machine and sets it to a state that means that it will make five double sided copies, enlarged to 141% and sorted. The command is executed and the user who is curious to know how this could be done by voice, generates a user request e.g. presses a button. The machine then generates a natural language instruction and uses voice synthesis to say "copy five times double sided enlarged to A3 and sorted". This command is not executed but is simply output as information to the user so that they know this command for next time.

In a second scenario, a user goes to a copying machine and says "fax this to Frank". They then see that the office number of Frank is recalled while they wanted the home telephone number. The user now starts to recite the entire number of Frank at home "fax this to 16483" but feels that there must be an easier way. Without executing the command they push the button generating a user request and there is displayed "fax this to Frank at home". The user will thus learn the most efficient natural language command which can be used.

In a final scenario, the user goes to a copying machine and wants to copy a book, so that the left half of something of A4 size is copied to the front of a B5 size paper, and the right half of the original on the backside. The user manages to set the options after numerous instructions and feels that there may be a quicker way. When the button is pressed to generate a user request, the machine uses speech synthesis to say "set to A4 to B5 book copying".

It can thus be seen from the foregoing embodiments, that the present invention greatly enhances the usability of the machine by providing information to a user to enable them to interact with a machine more efficiently in the future.

Although the present invention has been described hereinabove with reference to specific embodiments, the present invention is not limited to such embodiments and modifications which lie within the spirit and scope of the present invention will be apparent to a skilled person in the art.

The invention claimed is:

1. A user interface apparatus for use with a machine which can execute a number of user instructions to reach one of a plurality of possible machine states, wherein said user instructions can be input to said machine using at least natural language, the user interface apparatus comprising:

status means for obtaining a current state of said machine achieved by executing an instruction recieved from a user;

generating means responsive to the obtained current state of said machine, for generating a natural language instruction which could have been excuted by said machine to achieve the current state of said machine, irrespective of the instruction which has actually been executed to achieve the current state; and output means for outputting information to inform the user of the generated natural language instruction.

2. The user interface apparatus according to claim 1, including means for receiving a request from a user of said machine for said information, wherein said generating means is adapted to be responsive to a received request to generate said information.

3. The user interface apparatus according to claim 1, including means for receiving, from a user who has input a natural language instruction to arrive at the current state of said machine, a request for an appropriate natural language instruction to reach the current state, wherein said generating means is adapted to be responsive to a received request to generate said information as the requested appropriate natural language instruction.

4. The user interface apparatus according to claim 1, wherein said status means is adapted to maintain a data structure containing attributes defining the current state of the machine, each attribute having a number of possible values.

5. The user interface apparatus according to claim 4, wherein each attribute has at least one natural language fragment associated therewith, and said generating means is adapted to generate said information by building up a natural language instruction from said natural language fragments for said attributes defining the current state of said machine.

6. The user interface apparatus according to claim 5, wherein said generating means is adapted to build said natural language instruction in accordance with natural language rules.

7. The user interface apparatus according to claim 5, wherein said generating means is adapted to order said natural language fragments in accordance with order rules.

8. The user interface apparatus according to claim 5, wherein said generating means is adapted to replace elements in the natural language instruction with other elements in dependence upon at least one of previous user interactions, preferred synonyms, user preferences, and natural language input recognition problems.

9. The user interface apparatus according to claim 5, wherein said generating means is adapted to add natural language elements to said natural language instruction as at least one of a surrounding phrase and a politeness term.

10. The user interface apparatus according to claim 1, wherein said generating means is adapted to generate said information as text.

11. The user interface apparatus according to claim 10, wherein said output means is adapted to display said text.

12. The user interface apparatus according to claim 10, wherein said output means includes speech synthesis means for synthesising speech from said text and audio output means for audibly outputting said speech.

13. The user interface apparatus according to claim 1, wherein said generating means is adapted to generate said information as speech data.

14. A machine which can receive a number of user instructions to reach one of a plurality of possible machine states, said machine including: instructions input means to input said user instructions to said machine using at least natural language as a mode of input; and the user interface apparatus according to claim 1.

15. A user interface method for use with a machine which can execute a number of user instructions to reach one of a plurality of possible machine states, wherein said user instructions can be input to said machine using at least natural language, the method comprising:

obtaining a current state of said machine achieved by executing an instruction received from a user;

in response to the obtained current state of said machine, generating a natural language instruction which could have been executed by said machine to achieve the current state of said machine, irrespective of the instruction which has actually been executed to achieve the current state; and outputting information to inform the user of the generated natural language instruction.

16. The user interface method according to claim 15, including receiving a request from a user of said machine for said information, wherein said information is generated in response to said request.

17. The user interface method according to claim 15, including receiving, from a user who has input a natural language instruction to arrive at the current state of said machine, a request for an appropriate natural language instruction to reach the current state, wherein said information is generated as the requested appropriate natural language instruction in response to said request.

18. The user interface method according to claim 15, wherein the current state of said machine is obtained as a data structure containing attributes defining the current state of the machine, each attribute having a number of possible values.

19. The user interface method according to claim 18, wherein each attribute has at least one natural language fragment associated therewith, and said information is generated by building up a natural language instruction from said natural language fragments for said attributes defining the current state of said machine.

20. The user interface method according to claim 19, wherein said natural language instruction is built in accordance with natural language rules.

21. The user interface method according to claim 19, wherein said natural language fragments are ordered in said natural language instruction in accordance with order rules.

22. The user interface method according to claim 19, including replacing elements in the natural language instruction with other elements in dependence upon at least one of previous user interactions, preferred synonyms, user preferences, and natural language input recognition problems.

23. The user interface method according to claim 19, including adding natural language elements to said natural language instruction as at least one of a surrounding phrase and a politeness term.

24. The user interface method according to claim 15, wherein said information is generated as text.

25. The user interface method according to claim 24, wherein said text is displayed so as to be output to the user.

26. The user interface method according to claim 24, including speech data synthesis from said text, wherein said speech data is used to generate audible speech output to the user.

27. The user interface method according to claim 15, wherein said information is generated as speech data.

28. Program code for programming a processor to provide a user interface for a machine which can execute a number of user instructions to reach one of a plurality of possible machine states, wherein said user instructions can be input to said machine using at least natural language, the program code being operable to program the processor to:

obtain a current state of said machine achieved by executing an instruction received from a user;

in response to the obtained current state of said machine, generate a natural language instruction which could have been executed by said machine to achieve the current state of said machine, irrespective of the instruction which has actually been executed to achieve the current state; and output information to inform the user of the generated natural language instruction.

29. A carrier medium carrying the program code according to claim 28.

30. A user interface apparatus for use with a machine which can execute a number of user instructions to reach one of a plurality of possible machine states, wherein said user instructions can be input to said machine using at least natural language, the user interface apparatus comprising:

a status obtainer operable to obtain a current state of said machine achieved by executing an instruction received from a user;

a generator responsive to the obtained current state of said machine to generate a natural language instruction which could have been executed by said machine to achieve the current state of said machine, irrespective of the instruction which has actually been executed to achieve the current state; and an outputter operable to output information to inform the user of the generated natural language instruction.

* * * * *